United States Patent [19]

Tribken et al.

[11] 4,109,886
[45] Aug. 29, 1978

[54] SEMI-AUTOMATIC FLIGHT CONTROL SYSTEM UTILIZING LIMITED AUTHORITY STABILIZATION SYSTEM

[75] Inventors: Everett R. Tribken, Scottsdale; Ronald J. Miller, Glendale; Carl D. Griffith, Phoenix, all of Ariz.

[73] Assignee: Sperry Rand Corporation, New York, N.Y.

[21] Appl. No.: 648,238

[22] Filed: Jan. 12, 1976

Related U.S. Application Data

[63] Continuation of Ser. No. 534,326, Dec. 19, 1974, abandoned.

[51] Int. Cl.² ............................................. G05D 1/10
[52] U.S. Cl. .................................. 244/178; 73/178 R; 244/17.13; 244/196; 340/27 AT; 364/434
[58] Field of Search ...................... 244/17.13, 175, 178, 244/180, 181, 186, 187, 192, 196, 197; 73/178 R, 178 H; 235/150.2; 318/584, 585, 586; 340/27 R, 27 AT

[56] References Cited

U.S. PATENT DOCUMENTS

| | | | |
|---|---|---|---|
| 3,322,939 | 5/1967 | Curties | 235/150.2 |
| 3,386,689 | 6/1968 | Parker | 244/178 |
| 3,528,633 | 9/1970 | Knemeyer | 244/17.13 |
| 3,604,908 | 9/1971 | Loome | 244/187 |
| 3,848,833 | 11/1974 | Rauschelbach | 235/150.2 |

*Primary Examiner*—Trygve M. Blix
*Assistant Examiner*—Reinhard J. Eisenzopf
*Attorney, Agent, or Firm*—Howard P. Terry; Albert B. Cooper

[57] ABSTRACT

A flight control system utilizing a limited authority stability augmentation system having a long term attitude and/or path control input to enhance the automatic flight capability of the stability augmentation system. A position sensor coupled with the limited authority stability augmentation actuator provides an indication to the human pilot via a suitable indicator when the actuator is near or at the limit of its authority thereby permitting the human pilot to effect manual trim, thus recentering the actuator.

10 Claims, 6 Drawing Figures

SEMI-AUTOMATIC FLIGHT CONTROL SYSTEM UTILIZING LIMITED AUTHORITY STABILIZATION SYSTEM

This is a continuation of application Ser. No. 534,326, filed Dec. 19, 1974, now abandoned.

BACKGROUND OF THE INVENTION

1. Field of the Invention

The invention relates to control systems for navigable craft particularly with regard to flight control systems for aircraft utilizing limited authority actuators.

2. Description of the Prior Art

Full capability automatic flight control systems have been utilized in aircraft to provide short term stabilization as well as long term attitude and path control via full authority actuators of the parallel, series, or combined series/parallel types for the various control axes of the craft. Such systems are heavy, bulky and expensive and hence are normally utilized only in large scale aircraft such as twin rotor or large single rotor helicopters as well as large scale fixed wing aircraft which can readily accommodate the substantial weights of such complex systems. Amongst the heaviest, bulkiest and most expensive components of such systems are the full authority parallel actuators or more limited authority actuators with separate trim actuators as required to exercise control over the aircraft. These actuators are also exceedingly difficult and hence expensive to install.

Limited capability and hence lower cost automatic flight control systems have been and still are utilized in the prior art to exercise limited attitude control. However, such rudimentary automatic systems do not provide long term path control.

Stability augmentation systems (SAS) are also known for providing short term stability augmentation about the various axes of the aircraft, such systems normally utilizing limited authority series actuators that operate in response to short term sensors such as rate gyroscopes or vertical gyroscopes providing derived rate signals. Limited authority series actuators, as is known, are smaller, lighter, less complex and hence less expensive than full authority parallel actuators as described above.

In order to assist the human pilot in his navigation as well as his attitude and path control tasks, aircraft have also been equipped with flight director systems (FDS) that include flight director computers for providing signals to a flight direct instrument that instructs the pilot in a well known manner how to manually maneuver the craft so as to effect the desired control.

As is known, a helicopter is a particularly difficult aircraft to fly. Because of its inherent instability it normally requires two-handed control under all flight conditions and as a result, is exceedingly difficult to fly under instrument flight rule (IFR) conditions because the additional navigation requirements under such conditions (e.g. tuning communication and navigation radios, selecting courses and altitudes, checking charts, etc.) overtax and human pilot's capabilities. In order to relieve the human pilot of the task of stabilizing this unstable aircraft on a short term basis, many helicopters are provided with a stability augmentation system including a limited authority series actuator (short throw hydraulic or electric servo) controlled from rate gyroscopes or derived rates from vertical and directional gyroscopes. To further simplify the human pilot's tasks, particularly his navigational tasks, many helicopters are equipped with flight director systems.

While full authority, full capability automatic flight control systems have been installed in helicopters, these installations have been limited to only the very largest types of craft such as twin rotor or large single rotor helicopters which can easily accommodate the large weights and avionics/airframe cost ratio of a complete AFCS as discussed above. Thus smaller utility type helicopters as well as small fixed wing aircraft have been limited to the performance provided by short term limited authority stabilization systems such as a SAS and the navigation/path control assistance provided by a flight director system. Thus, heretofore, aircraft such as helicopters provided with a combination SAS/FDS were restricted to full time manual flight.

SUMMARY OF THE INVENTION

It is a primary object of the present invention to provide a significantly enhanced automatic flight control capability utilizing a limited authority stabilization system such as a SAS in combination with a source of long term data such as a flight direct computer.

This object is achieved by coupling a long term reference source to a limited authority stabilization system and by providing an indicator coupled to the position sensor for the limited authority actuator of the stabilization system to provide an indication of the need to manually trim the aircraft when the actuator is operating near or at the limit of its authority, such trimming permitting the repositioning of the actuator toward the central portion of its authority region. The pilot's workload is thus reduced from full time manual control to periodic retrimming.

DESCRIPTION OF THE PREFERRED EMBODIMENT

The present invention is applicable to a wide variety of navigable craft having numerous types of limited authority stabilization systems as well as a wide variety of long term reference sources. For purposes of description, the invention will be explained in terms of a helicopter having a stability augmentation system with a limited authority series actuator for providing short term stability augmentation of the aircraft and a flight director system for providing long term navigation, attitude and path control information to the human pilot. Although the invention is applicable to the control of a plurality of aircraft types about a plurality of axes, the invention will be described with regard to one axis of one aircraft type, i.e. the pitch axis of a helicopter.

Figure 1:
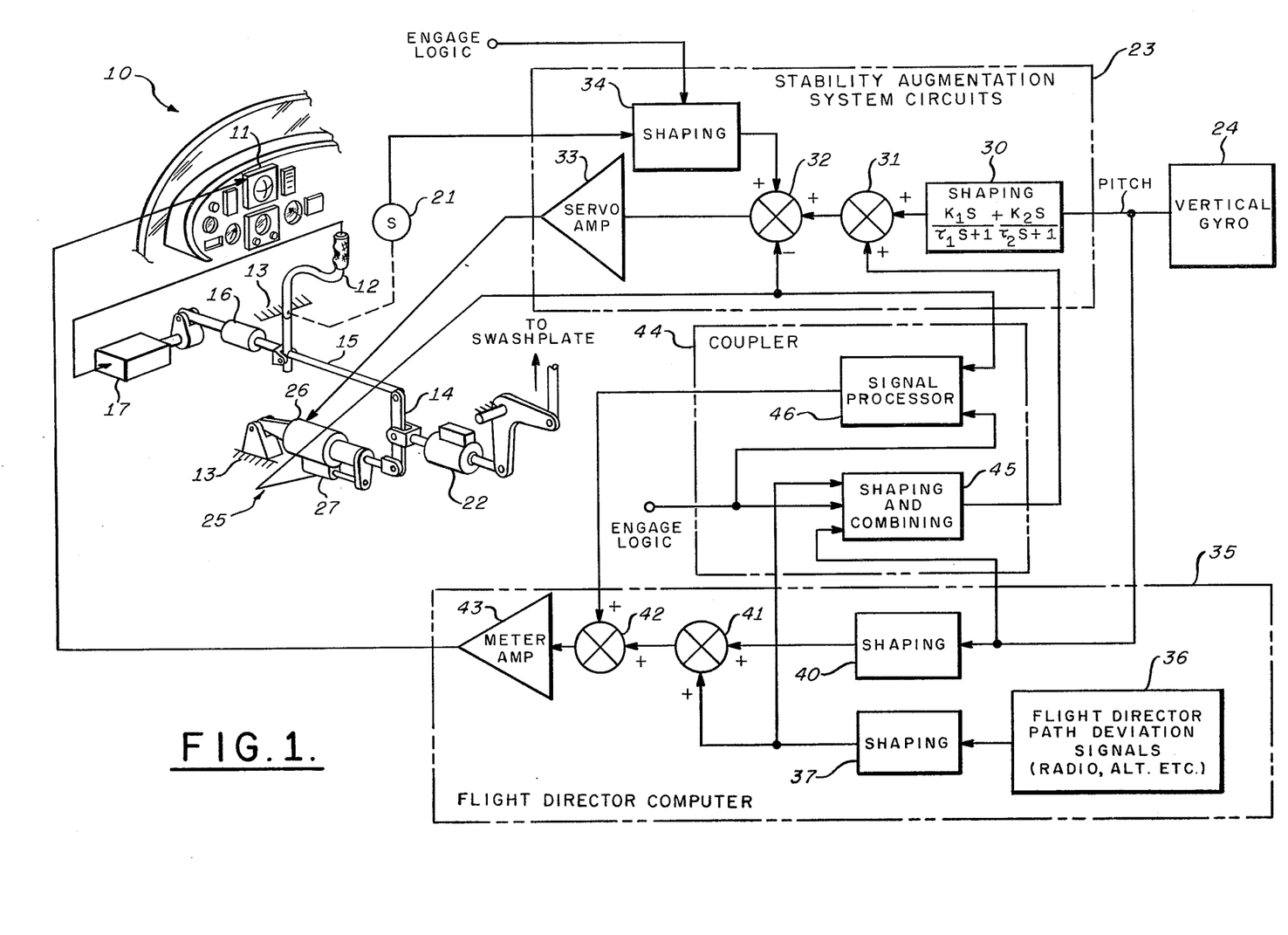
FIG. 1 is a schematic block diagram illustrating a control axis of a typical aircraft flight control system embodying the invention.

Referring to FIG. 1, a portion of a typical helicopter cockpit arrangement is illustrated at 10. The cockpit 10 includes the usual array of instruments including a flight director indicator 11. Amongst the helicopter controls is a cyclic pitch stick 12 which is illustrated as schematically mounted to the helicopter airframe 13 to impart control motions to a differential link 14 via a connecting rod 15. Connected to the rod 15 is a conventional feel spring mechansim 16 to impart artificial manual flight control reactions to the human pilot via the stick 12 in a well known manner. The central or zero force position for the mechanism 16 is determined in a conventional manner by a force trim release clutch mechanism 17 through appropriate linkages. The trim mechanism 17 is actuated in a well known manner by manipulation by the human pilot of a conventional force trim release button on the grip of the cyclic pitch control stick 12. A stick position transducer 21 is coupled to the control stick 12 to provide a signal representative of the displacement of the stick 12 from a central position. The output of the transducer 21 may be provided in terms of either stick force, stick displacement or the like in a well known manner.

The output of the differential linkage 14 is applied to the input of a convetional power boost actuator 22 which, in turn, applies control motion to the helicopter swash plate via appropriate linkages.

In order to provide short term stabilization of the helicopter stability augmentation system is included comprising stability augmentation circuits 23, a vertical gyroscope 24 and a limited authority SAS actuator 25. The limited authority actuator 25 may be of the type disclosed in U.S. Pat. No. 3,269,199 issued Aug. 30, 1966 to L. W. Deehan et al. entitled "Motion Converting Mechanism" and assigned to the assignee of the present invention. The actuator 25 includes a motor 26 and a feedback device such as a potentiometer 27 that provides a signal in accordance with the position of the actuator 25. The actuator 25 is appropriately fastened to the helicopter airframe 13 on one end thereof and provides its output to the differential link 14 at the other end thereof. It is thus appreciated that the actuator 25 is connected as a series element in the system as illustrated, but may be installed in other manners to achieve the same effect.

For the pitch axis stability augmentation exemplified in FIG. 1, the vertical gyro 24 provides a pitch displacement signal to a shaping network 30, a typical transfer function of which is shown within the block. The left hand term of the transfer function has a relatively short time constant $\tau_1$ and provides derived pitch rate for damping. The time constant $\tau_2$ is longer than the time constant $\tau_1$ and thus the right hand term of the transfer function provides washed out attitude for short term attitude stabilization as is well known in the art of helicopter stabilization. Alternatively, a rate gyroscope may provide the stability augmentation signals ot the SAS circuit 23 in place of the vertical gyroscope 24. In this embodiment the transfer function for the shaping network 30 may be $$K_1 + \frac{K_2}{\tau_2 S + 1}$$

where the left hand term provides the rate signal for the SAS system and the right hand term provides a lagged rate which functions as a pseudo short term attitude signal as is well known in helicopter stabilization. It will be appreciated that the vertical gyroscope 24 together with the shaping network 30 or alternatively the rate gyroscope and it shaping network comprise short term sensors for the SAS.

The shaped stability augmentation sensor signal from the block 30 is applied as an input to a summing junction 31 whose output is in turn applied as an input to a summing junction 32. The output of the summing junction 32 is applied to a conventional servo amplifier 33 which in turn drives the motor 26 of the actuator 25. The output of the feedback potentiometer 27 of the actuator 25 is applied in negative feedback fashion as an input to the summing junction 32. Thus it is appreciated the elements 32, 33, 25 and 27 comprise a conventional closed loop servo for driving the actuator 25 in accordance with the shaped stability augmentation sensor signals from the block 30.

The output of the stick position transducer 21 provides an input to the summing junction 32 via a shaping network 34. This path from the control stick 12 through the stability augmentation circuits 23 to the actuator 25 provides a control augmentation function that is well understood in the art. Briefly, the basic aircraft control provided through the control stick 12 via the rod 15, the link 14 and the power boost actuator 22 is augmentate by the signal from the stick position transducer 21 shaped in the network 34 and applied to the series actuator 25. Appropriate signal shaping is provided by the network 34 as is well understood by those skilled in the art. Typically the shaping network 34 may comprise a washout circuit serially connected with a lead-lag network as is well known. The shaping network 34 also receives an engage logic input to be used in connection with the invention in a manner to be later explained with regard to FIG. 6.

It will be appreciated that the stability augmentation system, command augmentation system (with the exception of the engage logic input to the shaping network 34) and the general aircraft configuration illustrated are conventional, many well known variations thereof being useable within the purview of the present invention. For example, the series arrangement for the actuator 25 is only one of many series actuator configurations that may be utilized in instrumenting a stability augmentation system. It is furthermore appreciated that a power boost actuator need not be utilized depending on the control load of the aircraft. In this instance the output of the differential like 14 would be connected directly to the swash place linkages. As a further example, a stability augmentation system may be utilized without command augmentation. It will be appreciated that limited authority stability augmentation systems of the type described are often utilized in aircraft for short term stability augmentation thereof.

As well as including a stability augmentation system for limited authority short term stabilization of the aircraft, the helicopter of FIG. 1 also includes a flight director system to provide long term navigation, attitude and path commands to the human pilot in a well known manner. The flight director system comprises a flight director computer 35 that provides a signal to the flight director indicator 11 and receives an attitude input signal from the vertical gyroscope 24. The flight director system illustrated may be of a conventional type such as that described in U.S. Pat. No. 2,845,623, issued July 29, 1958 to G. E. Iddings entitled "Aircraft Navigation System" and assigned to the assignee of the present invention.

The flight director computer 35, as described by the said Iddings patent, may include a plurality of sources of long term flight references such as radio path guidance, altitude signals and the like, schematically illustrated at 36. The signals from the block 36 which are primarily long term reference signals are shaped by shaping networks 37 generally in the manner taught in the said Iddings patent. The attitude signal from the vertical gyro 24 is applied to a shaping network 40 which typically may be instrumented as discussed in the Iddings patent.

The outputs of the shaping networks 37 and 40 are applied as inputs to a summing junction 41 whose output is in turn applied to a summing junction 42. The output of the summing junction 42 is applied via a meter amplifier 43 to drive the pitch command bar of the flight director instrument 11. The signals from the block 36 as well as the pitch attitude signal from the vertical gyro 24 are shaped by the networks 37 and 40 and combined in the summing junction 41 to drive the pitch bar of the flight director instrument 11 to provide pitch attitude commands to the human pilot in a well known manner. It will be appreciated that flight director apparatus for the remaining control axes may be similarly instrumented in a manner well known to those skilled in the art. It will further be appreciated that aircraft are often equipped with a flight director system of the type described to assist the human pilot in performing his navigation, attitude and path control functions.

Prior to the present invention aircraft, such as helicopters, that are equipped with a stability augmentation system and a flight director system have only had the capability for manual flight. Although the pilot's tasks have been simplified by the use of the conventional SAS and FSD, full pilot attention must still have been devoted to aircraft control. As discussed above, flight control automation has heretofore been achievable only by utilizing a full capability automatic flight control system with full authority parallel actuators having the attendant disadvantages described above.

In accordance with the invention, a fairly substantial automatic navigation, attitude and path control capability is provided by the addition of a negligible amount of equipment over that of the flight director and stability of augmentation systems. Still referring to FIG. 1, a coupler 44 is utilized to couple the stability augmentation and flight director systems to one another to provide long term control signals to the SAS from the FDS and to supply SAS actuator position data to the FDS. Basically, the coupled system flies the helicopter fully automatically until the SAS actuator runs out of authority, i.e. goes near or to substantially full extension or retraction which is an indication that the helicopter loading or configuration has changed thereby requiring re-trimming. When this condition occurs, the human pilot is automaticlly advised through controlled movement of the flight director pointer or by other signalling means whereupon he then simply re-trims the craft which restores the SAS actuator to its neutral position. Thus, in the coupled configuration, the system provides short to medium term control of the aircraft while the human pilot provides inputs for trim or for maneuvers for which sufficient actuator authority is not available.

The coupler 44 is comprised of a shaping and combining circuit 45 that is coupled to receive the shaped attitude command signal from the block 36 via the shaping network 37; the attitude signal from the vertical gyroscope 24 and an engage logic signal for coupling and de-coupling the SAS and FSD systems to and from one another. The output of the shaping and combining circuit 45 is applied as an input to the summing junction 31 in the SAS system and thus, in accordance with the state of the engage logic, couples the long term attitude command and attitude signals from the FDS to the SAS manner to be described.

The coupler 44 also includes a signal processor 46 coupled to receive the output from the feedback potentiometer 27 of the SAS actuator 25 and after processing this SAS actuator position signal in a manner to be explained, provides the processed signal as an input to the summing junction 42 of the flight director system. Thus the signal processor 46 provides the SAS actuator position data to the flight director system so that an indication is provided to the human pilot of his requirement to re-trim the craft when the SAS actuator is about to or has run out of authority. The signal processor 46 also receives the engage logic signal as an input which functions in the manner described with regard to the block 45.

Figure 2:
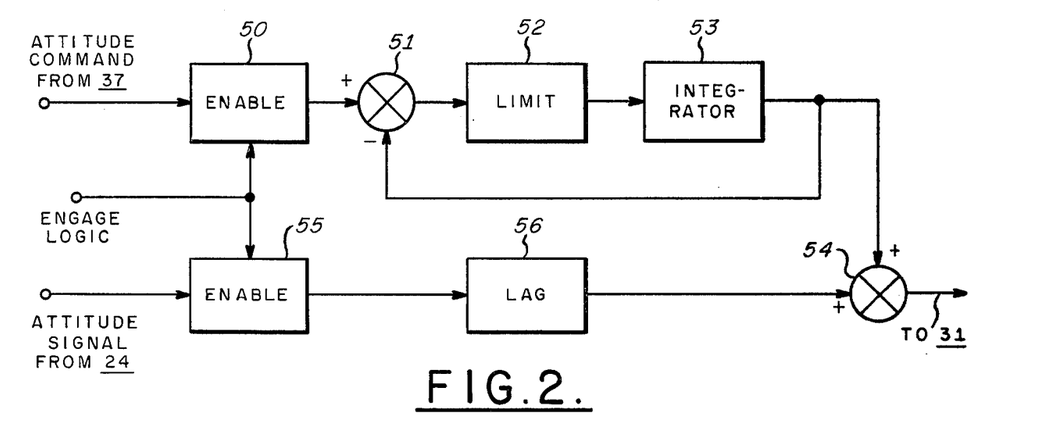
FIG. 2 is a schematic block diagram of the shaping and combining block of FIG. 1.

Referring now to FIG. 2, a block diagram of one embodiment of the shaping and combining circuit 45 of FIG. 1 is illustrated. The flight director attitude command signal from the shaping network 37 is applied through an enabling switch 50 to a summing junction 51. The output of the summing junction 51 is applied to a serially connected limiter 52 and integrator 53, the output of the integrator 53 being fed back as an input to the summing junction 51. The output of the integrator 53 is also applied as an input to a summing junction 54. The limiter 52 and integrator 53 is utilized in a well-known manner to provide body rate limiting in response to the attitude command from the flight director system. The limit value for the circuit 52 is set in accordance with the desired maximum attitude rates when the coupler 44 (FIG. 1) is enabled, i.e. when the system is in the coupled mode.

The attitude signal from the vertical gyro 24 is applied through an enabling switch 55 to a conventional lag circuit 56. The lag circuit 56 is designed in a well known manner to match the lag rate time constant or washed-out attitude time constant of the shaping circuit 30 (FIG. 1). The output of the lag circuit 56 is applied as an input to the summing junction 54 whose combined output is applied to the summing junction 31 (FIG. 1) in the stability augmentation system.

The engage logic signal is applied to both the switches 50 and 55 to couple or uncouple the SAS and FDS thereby placing the system into either a coupled mode or a SAS mode respectively.

Figure 3:
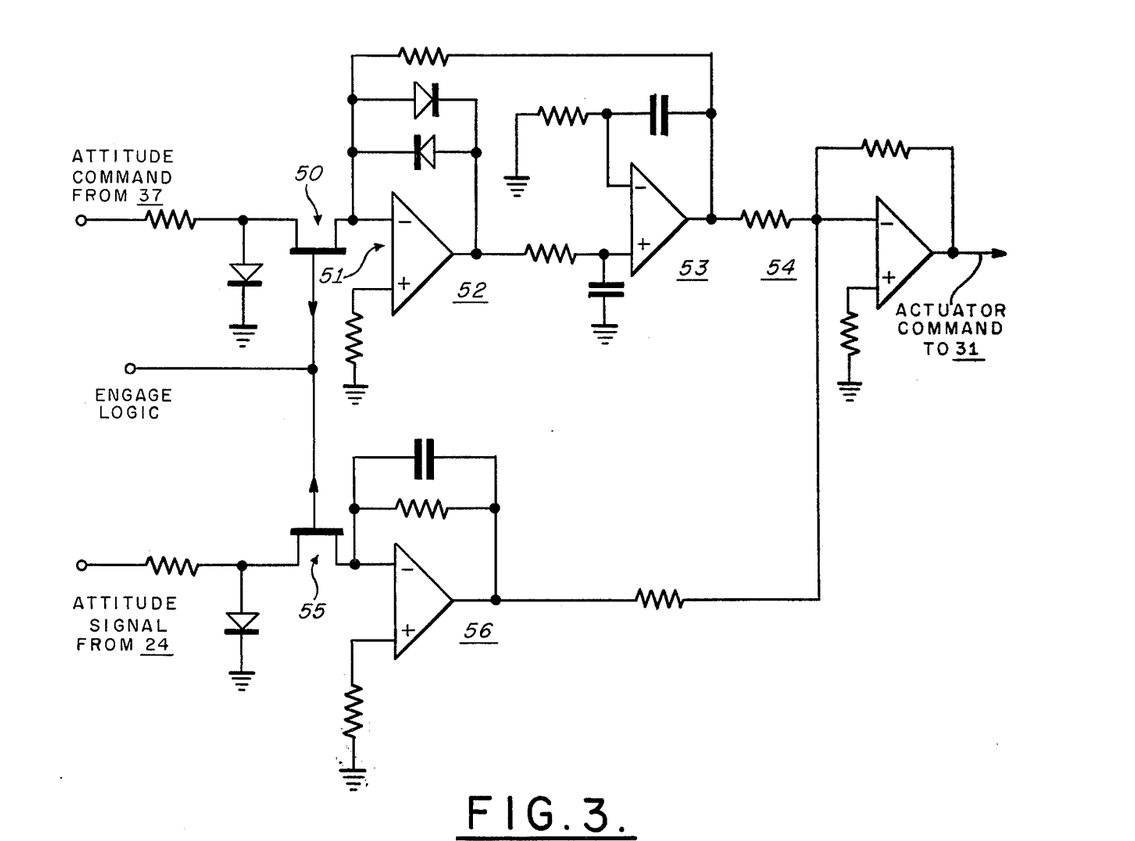
FIG. 3 is a schematic circuit diagram corresponding to the block diagram of FIG. 2.

Referring to FIG. 3 in which like reference numerals indicated like components with respect to FIG. 2, a specific circuit implementation for the block diagram of FIG. 2 is illustrated. The individual circuits are conventional and will not be further described herein for brevity.

Figure 4:
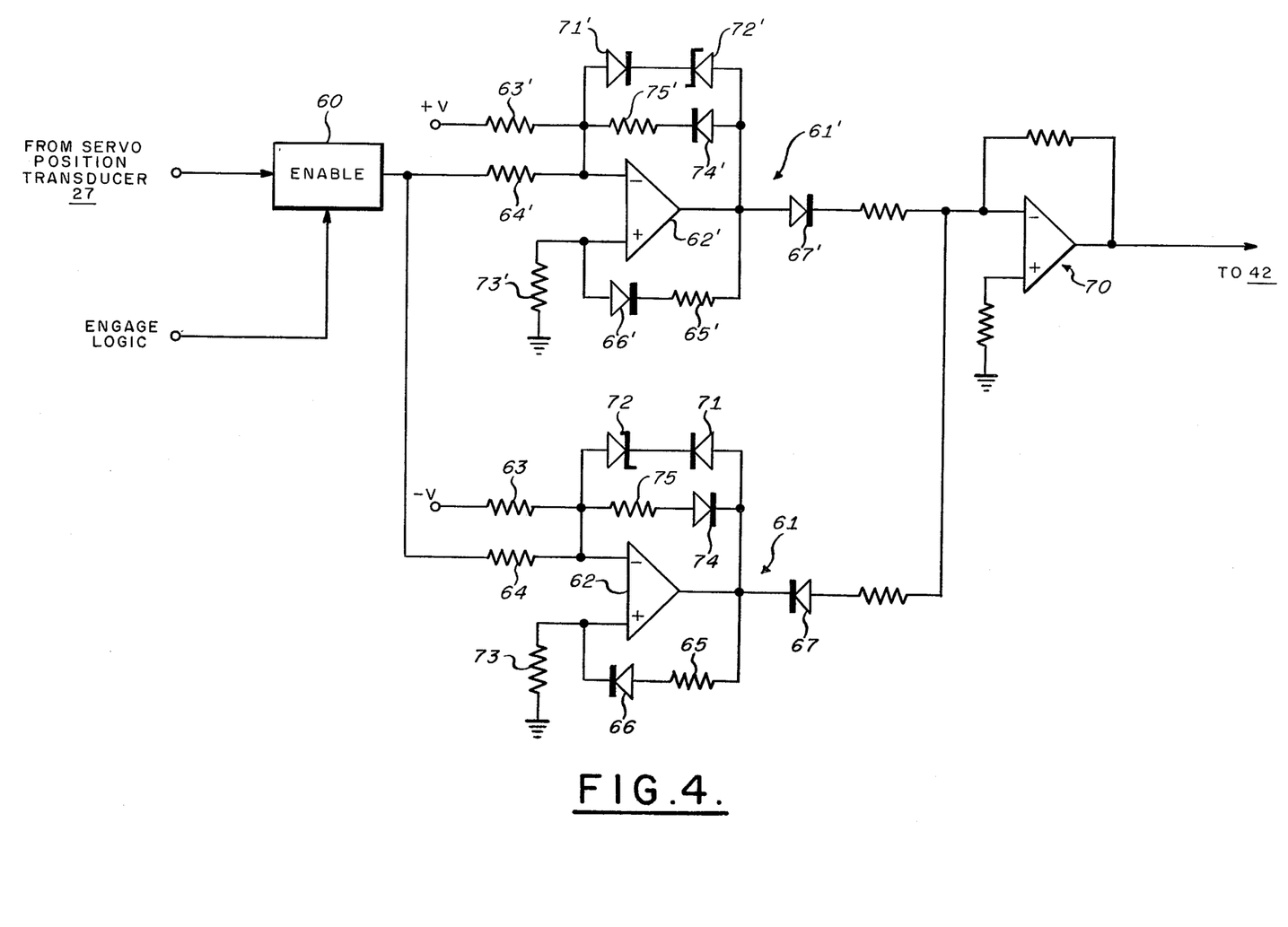
FIG. 4 is a schematic circuit diagram of the servo position signal processor block of FIG. 1.
Figure 5:
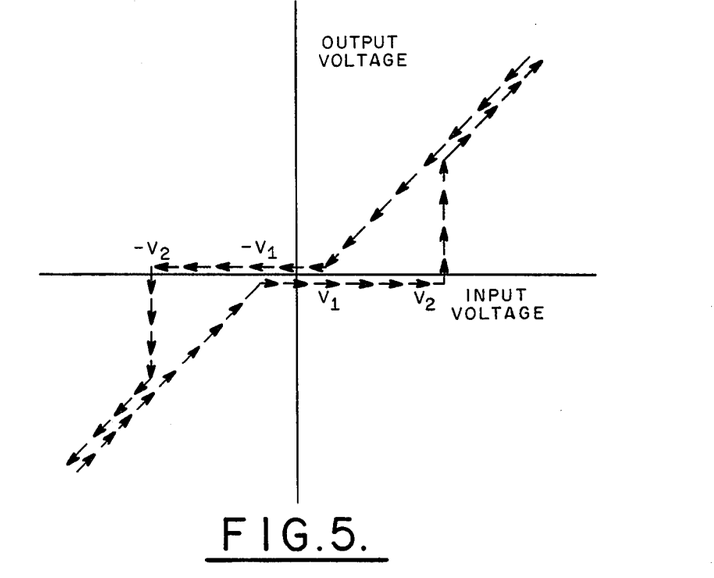
FIG. 5 is a transfer function diagram of the servo position signal processor of FIG. 4.

Referring now to FIGS. 4 and 5, a circuit implementation for the signal processor 46 of FIG. 1 and the transfer function thereof are respectively illustrated. The signal from the position transducer 27 of the SAS actuator 25 (FIG. 1) is applied through an enabling switch 60 to the signal processor circuitry. The enabling switch 60 receives an input from the engage logic signal for the reasons discussed above with regard to FIG. 2. When the SAS actuator 25 (FIG. 1) is displaced from its neutral position, a positive or a negative position transducer signal is applied through the switch 60, when enabled, in accordance with the amount and direction of the servo position displacement. The servo position transducer signal is applied in parallel to circuit branches 61 and 61', the branch 61 responding to the positive transducer signals to provide the transfer function to the right of the output voltage axis (FIG. 5) and the branch 61' responding to the negative position transducer signals to provide the transfer function to the left of the output voltage axis. Since the structure and operation of the branches 61 and 61' are substantially identical except for the difference in polarities of signals and components, only the branch 61 will be discussed in detail.

A bias voltage $-V$ is applied to the inverting input of an operational amplifier 62 through a resistor 63. In the absence of a signal from the servo position transducer 27 through an input resistor 64, the $-V$ voltage through the resistor 63 biases the amplifier 62 to positive saturation which saturation condition is maintained by a positive feedback path comprised of a resistor 65 and a diode 66. A diode 67 blocks the resulting saturation voltage from output stage 70. A circuit path including a diode 71 and zener diode 72 limits the value of the saturation voltage. It is appreciated that a voltage is maintained at the positive input to the amplifier 62 in accordance with the positive saturation output voltage thereof and the voltage divider established by the resistor 65 and a resistor 73. As the servo position voltage from the transducer 27 increases positively, the amplifier 62 remains in positive saturation until the voltage provided by the resistor 64 is large enough to cause the voltage at the netative input to the amplifier 62 to be equal to the voltage at the positive input thereof thus causing the amplifier 62 to switch to a negative output. When the amplifier 62 output becomes negative, the positive feedback path is back biased by reason of the diode 66 and a negative feedback path is established by a now forward biased diode 74 and a resistor 75. The input voltage at which the amplifier 62 comes out of saturation is designated as $V_2$ in FIG. 5. It is appreciated that the input voltage at which switchin occurs is determined by the values of the components 63, 64, 65, 72 and 73. This voltage level $V_2$ is set at a value equivalent to somewhat less than the authority limit of the SAS actuator 25 (FIG. 1) so that pilot trim will be initiated before servo saturation occurs. Since the negative output voltage of the amplifier 62 forward biases the negative feedback path comprised of the components 74 and 75, linear amplifier operation results as the input voltage is further increased above $V_2$. This negative output from the amplifier 62 is transmitted through the now forward biased diode 67 to the output stage 70 wherein it is inverted to provide the linear portion of the transfer function of FIG. 5 resulting from input voltages more positive than $V_2$. The output voltage is utilized to drive the attitude command bar of the flight director instrument 11 (FIG. 1) in a manner to be described.

When the human pilot responds by trimming the craft in a manner to be further explained, the SAS actuator 25 returns toward its central positon with a corresponding decrease in the magnitude of the servo position voltage applied through the resistor 64. The amplifier 62 continues to operate linearly until the servo position voltage decreases below a level determined by the resistors 63 and 64 resulting in the amplifier 62 again switching to positive saturation. The return to positive saturation occurs at the voltage $V_1$ as indicated in FIG. 5. The $V_1$ level is set near zero but large enough to prevent any tendency to overtrim due to instrument and pilot lags.

As discussed above, the branch 61' functions in a manner identical to that described for the branch 61 and will not be further described herein for brevity. The components of the branch 61' are designated by primed reference numerals corresponding to those of the branch 61.

Figure 6:
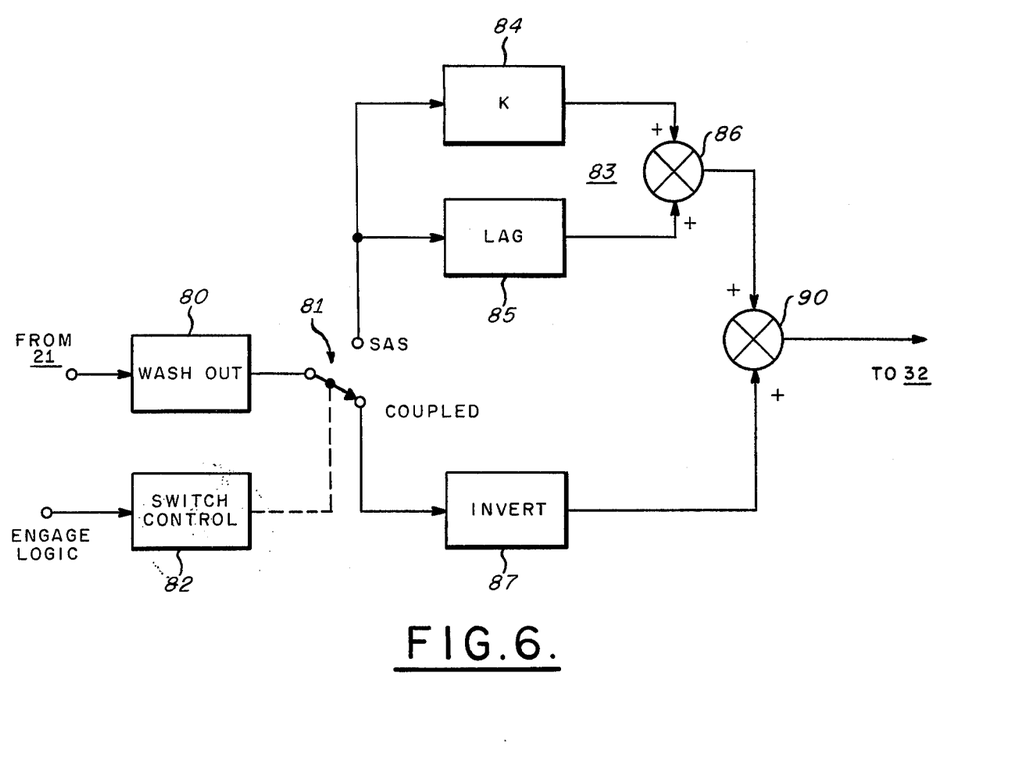
FIG. 6 is a schematic block diagram of the shaping network of the stability augmentation system of FIG. 1.

Referring now to FIG. 6, a schematic block diagram of typical shaping utilized in the block 34 (FIG. 1) of the stability augmentation system circuits is illustrated. The signal from the stick position transducer 21 is passed through a conventional washout circuit 80 to a two-position switch 81. The position of the switch 81 is controlled in a conventional manner via a switch control circuit 82 in response to the engage logic signal. It will be appreciated that the switch 81 and switch control 82 are schematically illustrated and are preferably instrumented in a practical system by a semiconductor switching arrangement. With the switch 81 in the SAS position, the signal from the washout circuit 80 is passed through a conventional lead-lag network 83 comprised of a displacement path 84 with an associated gain K and a parallel lag path 85, the displacement and lag terms being summed at summing junction 86. It will be appreciated that the serially connected washout circuit 80 and lead-lag network 83 comprise conventional command augmentation shaping well known to those skilled in the art.

With the switch 81 in the coupled position, the output of the washout circuit 80 is passed through an inverting circuit 87 preferably having a gain associated therewith that may be different from the gain K of the displacement path 84. The outputs of the lead-lag network 83 and the inverter 87 are applied to a summing junction 90 for application to the SAS circuits as described above.

Considering the system as disclosed hereinabove to be operating in the uncoupled or SAS mode, the engage logic signal applied to the blocks 34, 45 and 46 (FIG. 1) is set to a state to effect the following. The enable switches 50 and 55 of FIG. 2 and the enable switch 60 of FIG. 4 are disabled thus rendering the coupler 44 (FIG. 1) ineffective and hence decoupling the stability augmentation and flight director systems of FIG. 1 from one another. The engaged logic signal also sets the switch 81 of FIG. 6 to the SAS position thus placing the shaping network 34 (FIG. 1) into its conventional command augmentation configuration. With the system operating ihn the uncoupled or SAS mode as described, the stability augmentation system of FIG. 1 provides short term stability augmentation of the aircraft in a well known manner and the flight director system provides a visual navigation, attitude and path control commands to the human pilot via the flight director indicator 11 in a conventional manner. The human pilot thus controls the aircraft via the control stick 12, the links 14 and 15 and the power boost actuator 22 as well as through the conventional command augmentation path comprising the stick position transducer 21, the shaping network 34 in the SAS mode and the stability augmentation system with its limited authority actuator 25 as described above and illustrated in FIG. 1. Therefore, it is appreciated that when the SAS and FDS are uncoupled in their conventional modes of operation, only manual control of the aircraft is possible.

By the novel inclusion of the coupler 44 of FIG. 1 substantial automatic flight control is achieved by setting the engage logic signal to its coupled state. When the engage logic signal is so set the enable switches 50 and 55 of FIG. 2 and the enable switch 60 of FIG. 4 are enabled thus coupling the stability augmentation and flight director systems of FIG. 1 together. The engage logic signal being so set, also positions the switch 81 of FIG. 6 to the coupled positon thus placing the shaping network 34 (FIG. 1) into its coupled configuration. With the system so arranged the attitude command signals from the flight director computer 35 (FIG. 1) as well as the attitude signal from the vertical gyroscope 24 are applied as discussed above through the shaping and combining network 45 to the summing junction 31 of the stability augmentation system to provide long term control signals to the SAS servo thereby controlling the aircraft in the manner of a fully automatic flight control system. When, however, due to this long term control, the SAS actuator 25 approaches the limit of its authority, as indicated by the feedback potentiometer 27 achieving the voltage $V_2$ (FIG. 5), the signal processor 46 provides a voltage in accordance with the transfer function of FIG. 5, as discussed above, to the summing junction 42 thereby deflecting the appropriate flight director bar of the indicator 11 and providing a visual trim demand command to the human pilot. In response to this command the human pilot depresses the force trim release button on the grip of the control stick 12 thereby releasing the force trim clutch 17. The pilot then manipulates the control stick 12 so as to center the flight director command bar on the indicator 11 in the normal manner of flight director aircraft control. It will be appreciated from FIG. 6 that this control stick manipulation has the result of applying a signal from the stick position transducer 21 through the washout 80 and the inverter 87 to provide a signal to the SAS summing junction 32 that subtracts from the command from the servo amplifier 33 to the SAS actuator 25 thereby causing the SAS actuator 25 to return to its central or neutral position. When the signal from the feedback potentiometer 27 becomes smaller than the voltage $V_1$ (FIG. 5), the flight director command provided by the indicator 11 is satisfied and the bar is centered. When this occurs the pilot releases the force trim clutch button thereby engaging the clutch 17 and completing the trimming operation.

It will be appreciated that the described trimming procedure is effected without requiring an aerodynamic response from the aircraft thus avoiding an aircraft attitude upset. The gain of the inverter 87 (FIG. 6) is set so that effectively as the pilot applies his trimming motion to the control stick 12 the differential link 14 pivots about its central point and the SAS actuator 25 returns to its central position.

It will be appreciated by normally skilled practitioners in the art, after obtaining an understanding of the present invention as disclosed herein, that other arrangements may be utilized by the human pilot for satisfying the trim demand signal. For example, in the absence of a command augmentation input from the stick position transducer 21 to the SAS circuits 23 and hence the elimination of the shaping circuits 34, when the human pilot responds to the trim demand signal as described above, the aircraft responds aerodynamically to the motion of the control stick 12 and the SAS system in turn responds to return the SAS actuator 25 to its central position. Trim is effected in substantially the same manner when utilizing the conventional command augmentation arrangement for the shaping network 34 (FIG. 1), i.e. utilizing only the serially connected washout 80 and lead-lag network 83 (FIG. 6) or comparable conventional shaping as described above with regard to the uncoupled mode of operation. Trim would also be effected in substantially the same manner when utilizing a rudimentary helicopter configuration where the control stick is held in position by a frictional member and remains in the position to which it is manipulated by the pilot. In such an arrangement the helicopter would not include the feel spring 16, the clutch 17 and the associated force trim release button.

The present invention is also applicable to a helicopter utilizing a substantially more complex and sophisticated and hence more expensive beeper trim system. As is known, a beeper trim system includes a beeper control on the grip of the control stick 12 which provides a trim input to an aircraft manual trim system (not shown) whose output is in turn applied to a trim actuator that would be located within the block 17. With this arrangement any one of the conventional trimming procedures known to helicopter pilots may be utilized in satisfying the trim demand from the flight director indicator 11. It will be appreciated that the present invention obviates the necessity for utilizing the more complex beeper trim and trim actuator system, satisfactory trim performance being conveniently obtained by the simpler force trim release clutch arrangement.

It will be appreciated from the foregoing that by appropriately coupling a SAS and an FDS together in an exceedingly inexpensive manner significant flight control automation is achieved where no automation had heretofore been available. The system utilizes occasional cooperation by the human pilot to satisfy the trim demand signal when the SAS actuator 25 is about to or has run out of authority, thus permitting "hands off" flight for significantly long periods of time. This arrangement then permits the pilot to perform has radio communications, map or chart checking and other duties vital to IFR flying in a safer and more efficient manner than was heretofore possible in the absence of a full capability and hence expensive automatic flight control system.

The above described apparatus may additionally include a further convenience to the pilot of a signal light or other warning aid to indicate to the pilot that servo trim is required. This signal light may conveniently be mounted on the flight director indicator 11. The above described embodiment provides a computed trim demand signal as displayed on the flight director instrument 11 that firstly requests the pilot to effect manual trim and secondly, advises the pilot as to the direction and amount of trim required. It will be appreciated that although the above described embodiment of the invention was explained in terms of trimming when the SAS actuator 25 is approaching its limit of authority, the invention is also applicable where SAS servo saturation is detected when the actuator 25 reaches the limit of its authority. The invention has been described above in terms of one axis of aircraft control. It will be readily appreciated from the foregoing by those skilled in the art, how the precepts of the present invention may be applied to implement a multi-axis control system.

The preferred embodiment of the invention as hereinabove disclosed was explained in terms of stability augmentation and flight director systems. It will be appreciated that a flight director system is not a necessary component of the present invention. Other long term flight references may be utilized. For example, simple attitude hold configuration or radio path guidance arrangements may provide the long term signals to the coupler 44. The trim demand may then be displayed with indicator lights in the cockpit rather than on a flight director indicator, one light for each direction of trim being utilized. For an implementation of this type, the output of the servo position processor 44 could drive a threshold detector which would, in turn, energize the appropriate trim light. Alternatively, in systems that may or may not use a flight director computer, the signal processor 46 as illustrated in FIG. 3 may be replaced with a simple dead zone circuit with sufficient time lag added to the display to cause an appropriately small amount of over trimming.

As another alternative embodiment, a simple trim meter may be utilized directly coupled to the SAS actuator position transducer 27 to provide raw trim data to the pilot rather than or in addition to a computed trim demand signal. With such a system, the pilot may trim the craft at his discretion in accordance with the indication provided by the meter. Thus, such a meter for the display of raw trim data may be used in place of or in addition to the indicator for display of the computed trim demand signal, e.g. the flight director instrument as described above. It will be appreciated that such raw data indication could take many forms such as an advisory light, an aural warnin and/or the simple trim meter to indicate servo position.

It is appreciated from the foregoing that in addition to the advantages discussed above, the necessity for expensive automatic trim servos are obviated and replaced by an indication to the pilot of the trim demand to return the SAS actuator 25 to its central position.

The preferred embodiment of the invention as described above was explained in terms of a stability of augmentation system with a limited authority series actuator. It will be appreciated that the invention is also applicable to systems utilizing other types of limited authority servos where an input control command would normally cause the servo to exceed the limit of its authority. A trim demand signal would be generated to provide an indication to recenter the servo in accordance with the authority limit being approached or reached. Such indication could take many forms, such as an advisory light, aural warning and/or a simple meter to indicate servo position. Limited authority servos are often utilized instead of full authority servos because of the less stringent safety requirements therefor. Such servos along with the provisions of the present invention may be utilized in applications such as throttle control and the like.

The present invention has been described hereinabove in terms of aircraft control. It will be appreciated that the concepts of the invention are applicable to navigable craft in general such as surface ships and submarines or land vehicles and the like.

While the invention has been descriged in its preferred embodiments, it is to be understood that the words which have been used are words of description rather than limitation and that changes may be made within the purview of the appended claims without departing from the true scope and spirit of the invention in its broader aspects.

We claim:

1. A flight control system for aircraft having an attitude controlling element for controlling the attitude of said craft about an axis thereof and a manual controller for controlling said attitude controlling element, comprising
    a stability augmentation system having sensor means for sensing short term attitude changes of said craft about said axis and providing short term stabilization signals in response thereto and actuator means coupled to said attitude controlling element and responsive to said short term stabilization signals for suppressing said short term attitude changes, said actuator means having a limited displacement capacity from a reference position and tending to reach the limit of said displacement capacity in response to long term reference signals,
    position sensing means coupled to said actuator means for providing an actuator position signal representative of the position of said actuator with respect to said reference position,
    reference means for providing a long term reference signal,
    first coupling means for coupling said long term reference signal to said stability augmentation system for providing corresponding long term control of said craft through said limited displacement capacity actuator means,
    indicator means coupled to said position sensing means for displaying a visual command to the pilot in response to said actuator position signal to manipulate said manual controller to return said actuator means to said reference position when said actuator means approaches the limit of its displacement capacity in its response to said long term reference signal, and
    second coupling means coupling said position sensing means to said indicator means for providing a trim demand signal to said indicator means in response to said actuator position signal when said position signal exceeds a threshold representative of an actuator position near said limit of said displacement capacity and after said threshold has been exceeded a trim demand signal that diminishes toward zero as said manual controller is manipulated to return said actuator means to said reference position, thereby providing said visual command to said pilot.

2. The flight control system of claim 1 in which said second coupling means comprises means for providing said trim demand signal proportional to said position signal when said position signal exceeds said threshold representative of said actuator position near said limit of said displacement capacity and after said threshold has been exceeded said trim demand signal proportional to said position signal until said position signal diminishes below a level representative of an actuator position near said actuator reference position.

3. The flight control system of claim 2 in which said second coupling means comprises
    a source of bias voltage,
    means for combining said bias voltage with said position signal to provide a combined signal,
    an operational amplifier having said combined signal applied to an input thereof,
    a positive feedback loop connected around said amplifier to maintain said amplifier in a saturated condition whenever the amplifier output is of one polarity, and
    a negative feedback loop connected around said amplifier to provide linear operation thereof whenever the amplifier output is of polarity opposite said one polarity.

4. The flight control system of claim 1 in which said reference means comprises a flight director computer and said indicator means comprises a flight director indicator coupled to and driven by said flight director computer.

5. The flight control system of claim 1 in which said actuator means is coupled into said stability augmentation system as a series actuator.

6. The flight control system of claim 5 in which said stability augmentation system further comprises a servo loop including servo input summing means responsive to said short term stabilization signals, said series actuator responsive to the output of said servo input summing means, and said position sensing means coupled to said servo input summing means to provide said position signal thereto to close said servo loop.

7. The flight control system of claim 6 further including a manual controller position transducer coupled to said manual controller, and shaping means for coupling the output of said transducer to said servo input summing means to diminish the output thereof, thereby repositioning said actuator means toward said reference position when said manual controller is operated in response to said indicator means.

8. The flight control system of claim 7 in which said shaping means comprises a serially connected washout circuit and an inverter.

9. A combined manual automatic control system for an aircraft having a controlling element for controlling the attitude of the craft about an axis thereof and a manual controller for enabling the pilot to control said element, the combination comprising, (a) automatic stability augmentation apparatus having sensor means for sensing short term attitude changes of said craft about said axis and actuator means coupled with said controlling element and responsive to said sensor means for suppressing said short term attitude changes, said actuator having a displacement capacity from a normal reference position sufficient only to suppress said short term attitude changes and insufficient to control substantial long term changes in craft attitude under all normal flight conditions, (b) position sensing means coupled with said actuator and providing a signal proportional to the movement thereof from said normal reference position substantially to said displacement capacity thereof, (c) flight director computer apparatus for said aircraft including means for providing a computed long term attitude reference signal and indicator means responsive to said reference signal for displaying to the pilot the motion of said manual controller required to cause said craft to approach and maintain said reference attitude, (d) first coupling means coupling said reference signal to said actuator means for automatically controlling said craft to approach and maintain said computed reference attitude, thereby relieving the pilot of the need to operate said manual controller in response to said computed reference signal to cause said craft to approach and maintain said computed long term craft attitude, and (e) second coupling means coupled to receive said actuator position signal for providing a further signal to said indicator means upon said position signal reaching a value corresponding to said displacement capacity of said actuator and thereafter gradually decaying to said normal actuator position value in response to a corresponding operation of said manual controller.

10. The control system of claim 9 in which said second coupling means comprises means for providing a trim demand signal proportional to said position signal when said position signal exceeds a threshold representative of an actuator position near the limit of said displacement capacity and after said threshold has been exceeded, a trim demand signal proportional to said position signal until said position signal diminishes below a level representative of an actuator position near said reference position.

* * * * *